United States Patent [19]

Suzuki et al.

[11] Patent Number: 5,353,171

[45] Date of Patent: Oct. 4, 1994

[54] MAGNETO-OPTICAL RECORDING APPARATUS

[75] Inventors: Kayoko Suzuki, Kanagawa; Ariyoshi Nakaoki; Yoshihiro Muto, both of Tokyo, all of Japan

[73] Assignee: Sony Corporation, Tokyo, Japan

[21] Appl. No.: 920,844

[22] Filed: Jul. 28, 1992

[30] Foreign Application Priority Data

Jul. 30, 1991 [JP] Japan .................................. 3-190143

[51] Int. Cl.$^5$ .......................... G11B 5/02; G11B 5/127; G11B 7/00
[52] U.S. Cl. ...................................... 360/59; 360/114; 369/100
[58] Field of Search ................... 360/2, 59, 66, 67, 73, 360/104, 109, 103, 110, 114, 4; 369/13, 275.2, 192.26, 192.16, 192.23, 100

[56] References Cited

U.S. PATENT DOCUMENTS

| | | | |
|---|---|---|---|
| 4,771,347 | 9/1988 | Horimai et al. | 360/59 |
| 5,164,926 | 11/1992 | Matsumoto | 360/59 X |
| 5,224,068 | 7/1993 | Miyake et al. | 360/59 X |
| 5,241,520 | 8/1993 | Ohta et al. | 360/59 X |
| 5,263,015 | 11/1993 | Nihara et al. | 369/100 X |
| 5,270,994 | 12/1993 | Nakayama et al. | 360/114 X |
| 5,278,810 | 1/1994 | Takahaski et al. | 360/59 X |
| 5,283,770 | 2/1994 | Nakao et al. | 360/59 X |

FOREIGN PATENT DOCUMENTS

| | | |
|---|---|---|
| 0257530 | 3/1988 | European Pat. Off. . |
| 0351249 | 1/1990 | European Pat. Off. . |
| 0435425 | 7/1991 | European Pat. Off. . |
| 63-268103 | 4/1988 | Japan . |
| 63-52354 | 5/1988 | Japan . |

OTHER PUBLICATIONS

*Patent Abstracts of Japan*, vol. 13, No. 239, Nippon Teleger & Teleph Corp., Feb. 16, 1989.

Primary Examiner—Donald Hajec
Assistant Examiner—Thien Minh Le
Attorney, Agent, or Firm—Hill, Steadman & Simpson

[57] ABSTRACT

A magneto-optical recording apparatus records information on a magneto-optical recording medium composed of a memory layer and a recording layer which are disposed on a substrate, each comprising a magnetic thin film of amorphous-rare-earth transition-metal alloy. The memory and recording layers are magnetically coupled directly, or through an intermediate layer therebetween, to each other under an exchange force. A recording magnetic field generator such as a permanent magnet or an electromagnet applies a recording magnetic field to the magneto-optical recording medium, and an initializing magnetic field generator such as a permanent magnet or an electromagnet applies an initializing magnetic force to the magneto-optical recording medium. The initializing magnetic field generator has a magnetic pole confronting a surface of the magneto-optical recording medium. The initializing magnetic force comprises a magnetic field $H_V$ directed perpendicularly to the surface of the magneto-optical recording medium, and a magnetic field $H_H$ directed along the surface of the magneto-optical recording medium. The magnetic fields $H_V$, $H_H$ are defined as follows:

$$H_V \leq H_{C2} + H_{W2},$$

and $$H_H > \{(H_{C2} + H_{W2}) - H_V\} \times 1.7$$

where $H_{C2}$ is the coercive force of the recording layer and $H_{W2}$ is the exchange force.

2 Claims, 5 Drawing Sheets

MAGNETO-OPTICAL RECORDING APPARATUS

BACKGROUND OF THE INVENTION

1. Field of the Invention

The present invention relates to a magneto-optical recording apparatus for repeatedly overwriting information on a magneto-optical recording medium with an intensity-modulated laser beam.

2. Description of the Prior Art

Magneto-optical recording/reproducing apparatus for reading information bits, i.e., magnetic domains, through magneto-optical interaction employ different recording processes for rewriting recorded information or performing a repeated overwrite capability. These recording processes include a magnetic-field-modulated recording process which modulates an external field to be applied to a magneto-optical recording medium and a double-head recording process which uses a recording head and an erasing head.

One magnetic-field-modulated recording process is disclosed in Japanese laid-open patent publication No. 60-48806, for example. According to the disclosed process, to record information on a recording medium with an amorphous ferrimagnetic thin film having an easily magnetizable axis extending perpendicularly thereto, a laser beam is applied to an overwrite region on the recording medium to heat the same, and a magnetic field with its polarity reversed according to the information to be recorded, e.g., a value of "0" or "1", is perpendicularly applied to the ferrimagnetic thin film to magnetize the same for thereby recording the information. However, attempts to record desired information on the recording medium at high speed with a high information transfer rate require an electromagnet that can operate at high frequency. Such an electromagnet cannot easily be fabricated, consumes a large amount of electric energy, and dissipates a large amount of heat.

According to the double-head recording process, any recorded information on the recording medium is erased, or "initialized", by the erasing head before desired information is overwritten. Since the two heads are positioned in spaced-apart relationship, the magneto-optical drive systems based on the double-head recording process require a complex manufacturing and assembling process, are relatively large in size, and hence are not economic.

To solve the above problems, there have been proposed thermomagnetic (magneto-optical) recording methods as disclosed in Japanese laid-open patent publications Nos. 63-52354, 63-268103, and 2-24801.

As shown in FIG. 1 of the accompanying drawings, the recording medium disclosed in Japanese laid-open patent publication No. 63-52354 employs a magnetic recording medium 20 composed of a memory layer 1 and a recording layer 2 which are magnetically coupled to each other and disposed on a substrate 11, each of the memory and recording layers 1, 2 comprising a perpendicularly magnetizable magnetic thin film of amorphous-rare-earth transition-metal alloy. The memory and recording layers 1, 2 have respective coercive forces $H_{C1}$, $H_{C2}$ ($H_{C1} >> H_{C2}$) and respective Curie temperatures $T_{C1}$, $T_{C2}$ ($T_{C1} < T_{C2}$).

While an external magnetic field Hex is being applied to the recording medium 20, the recording medium 20 is switched, depending on the information to be recorded, e.g., a value of "0" or "1", between a first heated state in which the recording medium 20 is heated to a first temperature $T_1$ that is higher than the Curie temperature $T_{C1}$ of the memory layer 1 and at which the sublattice magnetization of the recording layer 2 is not reversed, and a second heated state in which the recording medium 20 is heated to a second temperature $T_2$ that is higher than the Curie temperature $T_{C1}$ and which is high enough to reverse the sublattice magnetization of the recording layer 2. When the recording medium 20 is cooled, the orientation of the sublattice magnetization of the memory layer 1 is aligned with that of the recording layer 2 due to the exchange force between the memory and recording layers 1, 2, thus forming a recording bit, i.e., a magnetic domain, of "0" or "1", in the memory layer 1 and also reversing the sublattice magnetization of the recording layer 2 into a direction (hereinafter referred to as a normal direction) at the time the recording medium 2 was initialized, under an initializing external magnetic field $H_i$ applied to the recording layer 2. In this manner, the recording medium 2 is brought into a condition in which desired information can be overwritten on the recording medium 2.

The above recording medium does not need any special process or time for erasing recorded information, and allows desired information to be recorded at high transfer rate. The disclosed arrangement is also effective to solve the problems with the double-head recording process and the magnetic-field-modulated recording process.

The recording medium disclosed in Japanese laid-open patent publication No. 2-24801 employs a magnetic recording medium 20 as shown in FIG. 2 of the accompanying drawings. The recording medium 20 comprises the substrate 11, the memory layer 1, and the recording layer 2 which are identical to those shown in FIG. 1. The recording medium 20 additionally has an intermediate layer 3 disposed between the memory and recording layers 1, 2 for controlling the magnetic wall energy therebetween for reliable reversal of the sublattice magnetization of the recording layer 2 into the normal direction.

To record desired information on the recording medium 20 shown in FIG. 2, the recording medium 20 which may typically in the form of a disk, is rotated by a drive motor 25. A recording unit for recording the information comprises an optical head for applying a laser beam for heating the recording medium 20 selectively to the first and second temperatures $T_1$, $T_2$, and a recording magnetic field generator such as a permanent magnet for applying an external magnetic field $H_{ex}$ to the recording medium 20. An initializing magnetic field generator such as a permanent magnet is provided, downstream of the recording magnetic field generator in the direction in which the recording medium 20 rotates, for applying an initializing magnetic field $H_i$ to initialize the recording layer 2.

The initializing magnetic field $H_i$ has an intensity smaller than the coercive force $H_{C1}$ of the memory layer 1. In order to reliably direct the sublattice magnetization of the recording layer 2 into the normal direction which is perpendicular to the recording layer 2, the initializing magnetic field generator has its N and S poles oriented along a direction perpendicular to the plane of the recording medium 20 for applying a perpendicular magnetic field whose intensity is greater than at least the sum of the coercive force $H_{C2}$ of the recording layer 2 and the exchange force $H_{W2}$. In addition, the permanent magnet as the initializing magnetic field generator is selected to generate a relatively large magnetic field intensity large enough to produce the necessary perpendicular magnetic field, or an auxiliary magnetic pole or magnet of high magnetic permeability is disposed opposite to the initializing magnetic field generator with the recording medium 20 interposed therebetween, for applying an intensive perpendicular magnetic field efficiently to the recording medium 20.

However, since the auxiliary magnetic pole is disposed in confronting relationship to the magneto-optical recording medium, the overall magneto-optical recording apparatus is relatively large in size, complex in structure, and cannot easily be assembled. Nevertheless, increasing the perpendicular magnetic field without resorting to the auxiliary magnetic pole would cause various problems such as leakage flux and the need to increase the capability of the magnetic field generator.

OBJECTS AND SUMMARY OF THE INVENTION

It is an object of the present invention to provide a magneto-optical recording apparatus which will solve the aforesaid problems of the conventional magneto-optical recording apparatus.

According to the present invention, there is provided a magneto-optical recording apparatus for recording information on a magneto-optical recording medium composed of a substrate, a memory layer and a recording layer which are disposed on the substrate, each of the memory and recording layers being comprising a magnetic thin film of amorphous-rare-earth transition-metal alloy, the memory and recording layers being magnetically coupled directly, or through an intermediate layer therebetween, to each other under an exchange force, the magneto-optical recording apparatus comprising recording magnetic field generating means for applying a recording magnetic field to the magneto-optical recording medium, and initializing magnetic field generating means for applying an initializing magnetic force to the magneto-optical recording medium, the initializing magnetic field generating means having a magnetic pole adapted to be disposed in confronting relationship to a surface of the magneto-optical recording medium, the initializing magnetic force comprising a magnetic field $H_V$ directed perpendicularly to the surface of the magneto-optical recording medium, and a magnetic field $H_H$ directed along the surface of the magneto-optical recording medium, the magnetic fields $H_V, H_H$ being defined as follows:

$$H_V \leq H_{C2} + H_{W2} \tag{1}$$

$$H_H > \{(H_{C2} + H_{W2}) - H_V\} \times 1.7 \tag{2}$$

where $H_{C2}$ is the coercive force of the recording layer and $H_{W2}$ is the exchange force.

The exchange force $H_{W2}$ is given by:

$$H_{W2} = \sigma w / 2 M_{S2} h_2 \tag{3}$$

where $\sigma w$ is the magnetic wall energy between the memory and recording layers when they are directly coupled to each other, or the magnetic wall energy between the intermediate and recording layers when the intermediate layer is interposed between the memory and recording layers, and $M_{S2}$ and $h_2$ are the saturation magnetizing force and thickness, respectively, of the recording layer.

With the magnetic field $H_H$ being applied along the surface of the magneto-optical recording medium, the magnetic field $H_V$ may be smaller than heretofore, i.e., smaller than the sum of the coercive force $H_{C2}$ and the exchange force $H_{W2}$ of the recording layer.

Since the magnetic field $H_V$ may be reduced, the initializing magnetic field generating means for initializing the recording layer is positioned only on one side of the magneto-optical recording medium. As a result, the magneto-optical recording apparatus may be relatively simple in structure and small in size.

The initializing magnetic field may be reduced in intensity, and hence the permanent magnet or electromagnet used as the initializing magnetic field generator may be less intensive. As a consequence, any leakage flux may be reduced in intensity.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 3:
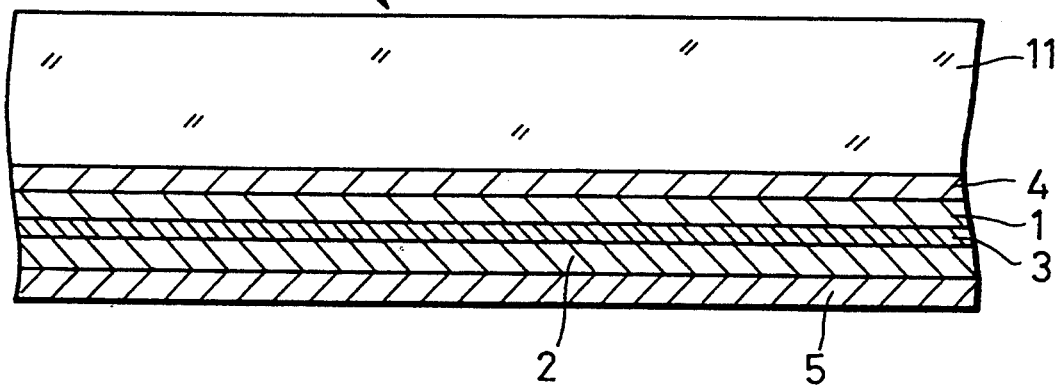
FIG. 3 is a fragmentary cross-sectional view of a magneto-optical recording medium used in the present invention.

As shown in FIG. 3, a magneto-optical recording apparatus according to the present invention employs a magneto-optical recording medium 20 typically in the form of a magneto-optical disk. The magneto-optical recording medium 20 comprises a memory layer 1 and a recording layer 2 which are magnetically coupled to each other under exchange forces and disposed on a substrate 11 of a light-transmissive material such as glass, acrylic resin, polycarbonate, or the like, each of the memory and recording layers 1, 2 comprising a perpendicularly magnetizable magnetic thin film of amorphous-rare-earth transition-metal alloy. The magneto-optical recording medium 20 also includes an intermediate layer 3 interposed between the memory and recording layers 1, 2.

More specifically, a dielectric layer 4 comprising a transparent SiN film is deposited as a protective layer or an interference layer on the substrate 11 as of polycarbonate. The memory layer 1, the intermediate layer 3, and the recording layer 2 are successively deposited on the dielectric layer 4 by sputtering. A protective film 5 in the form of a nonmagnetic metal film or a dielectric film is disposed on the recording layer 2.

The memory layer 1 is made of $T_{b20}$ $(Fe_{91}Co_5Cr_4)_{80}$ having a greater transition-metal content with large perpendicular magnetic anisotropy. The memory layer 1 has a thickness $h_1$ of 30 nm, a Curie temperature $T_{C1}$ of 175° C., a coercive force $H_{C1}$ of 20 kOe at room temperature, and a saturation magnetizing force $M_{s1}$ of 100 G.

The intermediate layer 3 is made of $Gd_{45}$ $(Fe_{91-}Co_5Cr_4)_{55}$ with small perpendicular magnetic anisotropy. The intermediate layer 3 has a thickness $h_3$ of 30 nm, a Curie temperature $T_{C3}$ of 250° C., and a saturation magnetizing force $M_{s3}$ of 300 G.

The recording layer 2 is made of $(Gd_{75}Tb_{25})_{26}$ $(Fe_{66-}Co_{30}Cr_4)_{74}$ having a greater rare-earth content with large perpendicular magnetic anisotropy. The recording layer 2 has a thickness $h_2$ of 70 nm, a Curie temperature $T_{C2}$ higher than 370° C., a compensation temperature $T_{comp}$ of 195° C., a coercive force $H_{C2}$ of 4 kOe at room temperature, and a saturation magnetizing force $M_{s2}$ of 130 G.

Figure 4:
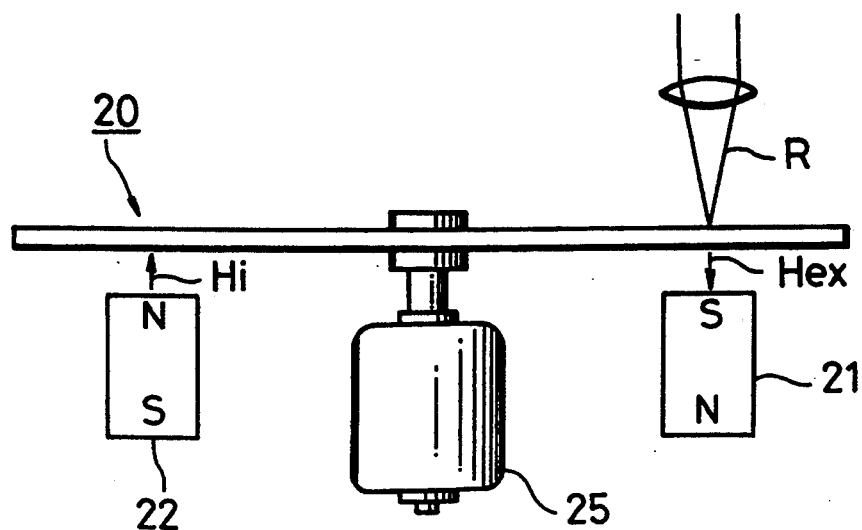
FIG. 4 is a side elevational view of a magneto-optical recording apparatus according to the present invention.

FIG. 4 shows a magneto-optical recording apparatus according to the present invention. The magneto-optical recording apparatus has a motor 25 for rotating the magneto-optical recording medium or magneto-optical disk 20, an optical head for applying a laser beam R to the recording medium 20 from the substrate side for heating the recording medium 20 selectively to first and second temperatures $T_1$, $T_2$ depending on information to be recorded, e.g., a value of "0" or "1", and a recording magnetic field generator 21 such as a permanent magnet or an electromagnet for applying an external magnetic field $H_{ex}$ to a region of the recording medium 20 where the laser beam R is applied, the recording magnetic field generator 21 having N and S poles oriented along a direction substantially perpendicular to the recording medium 20.

The magneto-optical recording apparatus also has an initializing magnetic field generator 22 such as a permanent magnet or an electromagnet positioned downstream of the optical head and the recording magnetic field generator 21 in the direction in which the magneto-optical recording medium 20 rotates, for applying a constant magnetic field to the recording layer 2 to initialize the same.

Figure 5:
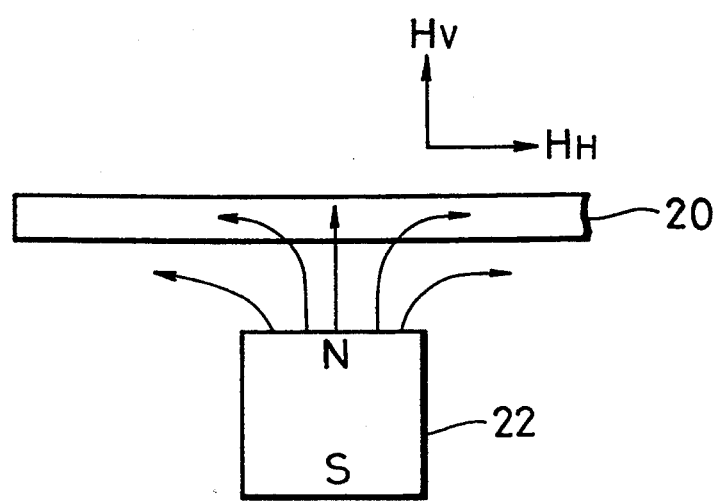
FIG. 5 is a schematic view showing an initializing magnetic flux distribution for initializing a recording layer.

As shown in FIG. 5, the initializing magnetic field generator 22 is located only on one side of the magneto-optical recording medium 20, with no auxiliary magnetic pole or magnet on the other side of the magneto-optical recording medium 20, for generating a magnetic field $H_H$, which positively satisfies the formula (2) referred to above, along the plane of the magneto-optical recording medium 20 so that the magnetic field $H_H$ can magnetize the magneto-optical recording medium 20 as indicated by the arrows in FIG. 5.

The recording magnetic field generator 21 applies a magnetic field $H_V$, which satisfies the formula (1) referred to above and actually ranges from 1 kOe to 10 kOe, perpendicularly to the magneto-optical recording medium 20.

Actually, therefore, the magnetic field $H_H$ along the plane of the magneto-optical recording medium 20 should preferably be in a range that is determined with $H_V$ 1 kOe and $H_V$32 10 kOe in the formula (2).

Figure 6:
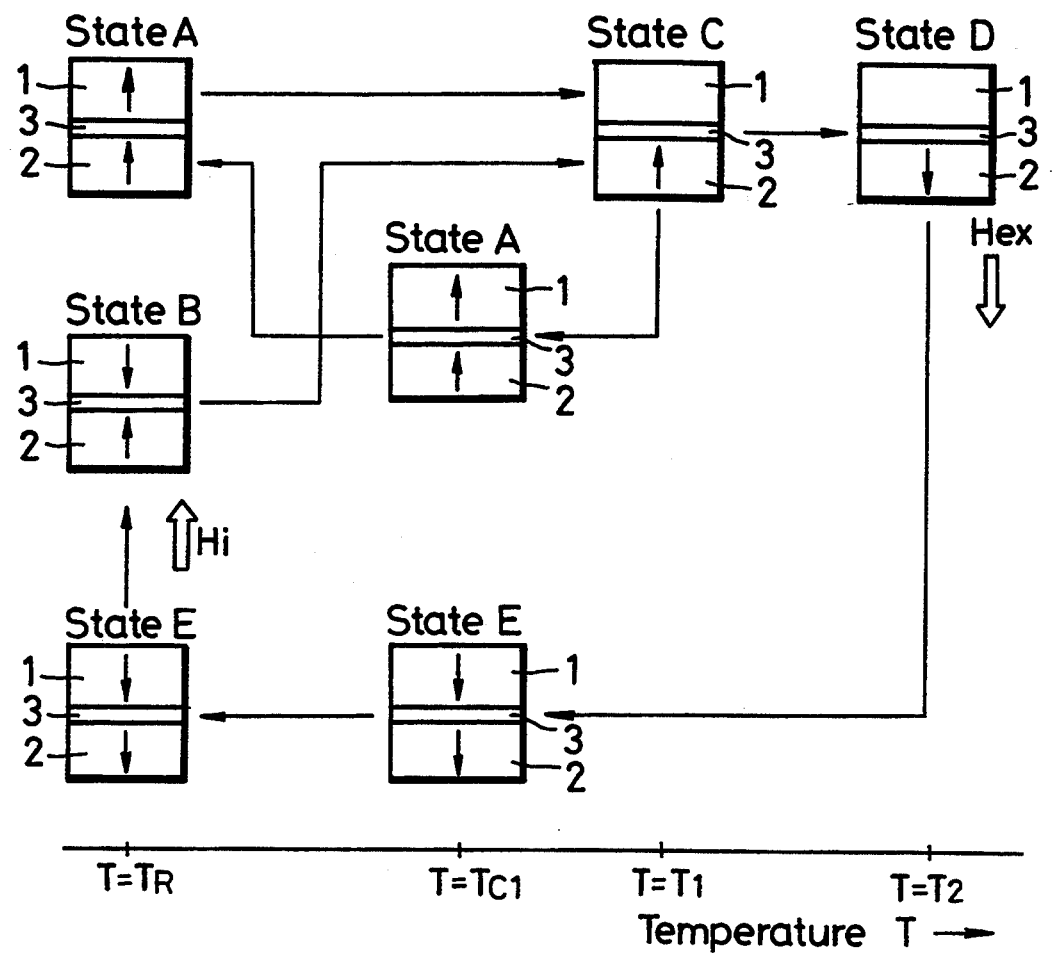
FIG. 6 is a diagram illustrative of operation of the magneto-optical recording apparatus according to the present invention.

Desired information can be recorded on the magneto-optical recording medium 20 in the same manner as described in Japanese laid-open patent publication No. 2-24801. Specifically, FIG. 6 shows different magnetized states in the memory and recording layers 1, 2 at different temperatures T as indicated by the arrows. At a room temperature $T_R$, pieces of information, e.g., "0" and "1", are recorded on the magneto-optical recording medium 20 by a state A in which the layers 1, 2 are magnetized in one direction and a state B in which the layers 1, 2 are magnetized in opposite directions. These pieces of information are recorded when the external magnetic field (recording magnetic field) $H_{ex}$ is applied to the magneto-optical recording medium 20 and the magneto-optical recording medium 20 is heated to a first temperature $T_1$ with a low laser beam power $P_L$ and to a second temperature $T_2$ with a high laser beam power $P_H$.

For example, the power of the laser beam R applied to a certain region of the magneto-optical recording medium 20 which is in the state A is modulated by a recording signal representative of the information to be recorded to heat the region to the first temperature $T_1$ that is higher than the Curie temperature $T_{C1}$ of the memory layer 1 and at which the sublattice magnetization of the recording layer 2 is not reversed. When the region of the magneto-optical recording medium 20 is thus heated, the memory layer 1 is brought into a state C in which it is no longer magnetized. After the heating, the temperature of the memory and recording layers 1, 2 drops below the Curie temperature $T_{Cl}$, allowing the memory layer 1 to be magnetized. At this time, the exchange force between the memory layer 1 and the recording layer 2 becomes dominant, thereby magnetizing the memory layer 1 in the same direction as the recording layer 2. As a result, the memory and recording layers 1, 2 are brought into the state A, whereupon the information of "0", for example, is recorded in the region.

Another region of the magneto-optical recording medium 20 is heated to the second temperature $T_2$ that is higher than the first temperature $T_1$ and at which the sublattice magnetization of the recording layer 2 is reversed by the external magnetic field $H_{ex}$. When the region of the magneto-optical recording medium 20 is thus heated, the memory layer 1 is no longer magnetized and brought into a state D in which the magnetization of the recording layer 2 is reversed. When the temperature of the memory and recording layers 1, 2 drops below the Curie temperature $T_{Cl}$ after the heating, the region is brought into a state E in which the memory layer 1 is magnetized in a direction opposite to the initially magnetized direction due to the exchange force between the memory and recording layers 1, 2. Then, an external magnetic field $H_i$ is applied to reverse the magnetization of the recording layer 2 substantially at the room temperature $T_R$. Now, the region is brought into the state B in which a magnetic wall is created by the intermediate layer 3 between the memory and recording layers 1, 2 through the control of the magnetic wall energy. In the state B, the memory layer 1 is magnetized in a direction opposite to the direction in which it is magnetized in the state A, thus recording the information of "1", for example, in the region.

The information of "0" and "1" can therefore be recorded on the magneto-optical recording medium 20 by the respective states A, B. In each of the states A, B, the region can be overwritten by the intensity-modulated laser beam. Specifically, when heated to the temperature $T_1$ or $T_2$, any region can be shifted from the state A or B through the state C back to the state A or B, and hence overwritten with the information of "0" or "1".

The recorded information can be read from the magneto-optical recording medium 20 as follows: A laser beam which is much lower in power than the laser beam R that is used to write information is applied to the magneto-optical recording medium 20. The plane of linear polarization of the laser beam reflected by the magneto-optical recording medium 20 is rotated by magneto-optical interaction, i.e., the Kerr effect or the Faraday effect. The rotation of the plane of linear polarization of the reflected laser beam is detected as a change in the intensity of the writing laser beam, and converted into an electric output signal that is representative of the recorded information.

Figure 7:
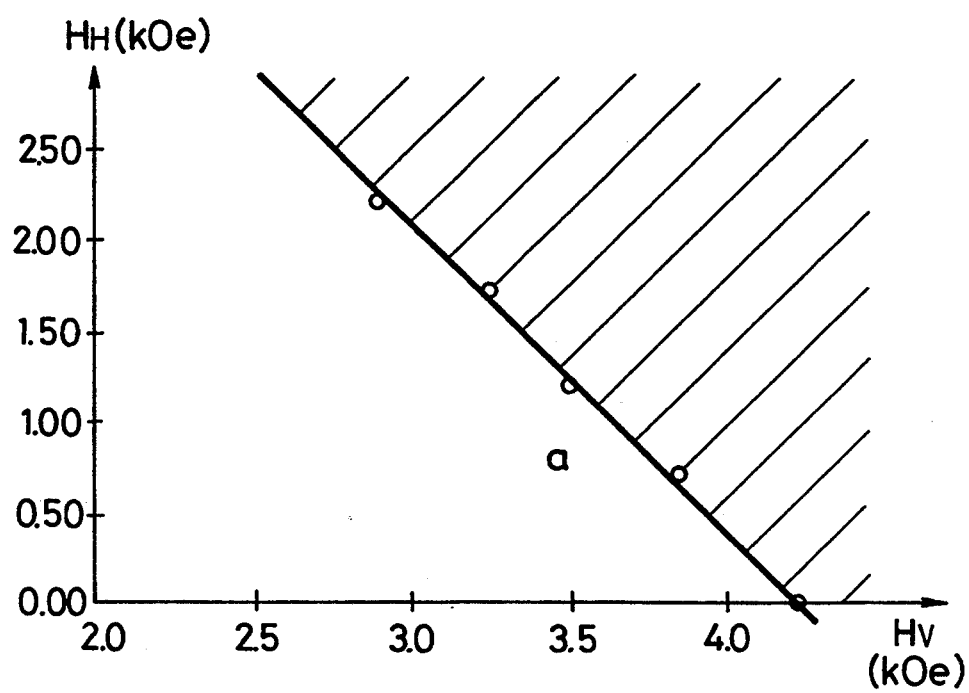
FIG. 7 is a graph showing an initializable region of the recording layer.

The magnetic fields $H_V$, $H_H$ for initializing the recording layer 2 of the magneto-optical recording medium 20 were measured, and it was found that the recording layer 2 was initialized well in a hatched region on the righthand side of a straight line a shown in FIG. 7. The straight line a is translated as the value of $H_{C2} + H_{W2}$ varies, resulting in the relationship indicated by the formula (2) above.

Practically, the magnetic field $H_V$ should preferably be in the range of from 1 kOe to 10 kOe, as described above. If the magnetic field $H_V$ were smaller than 1 kOe, then a problem would arise in the reliable initialization of the recording layer 2. If the magnetic field $H_V$ were in excess of 10 kOe, then the memory layer 1 would be magnetized unstably.

Figure 1:
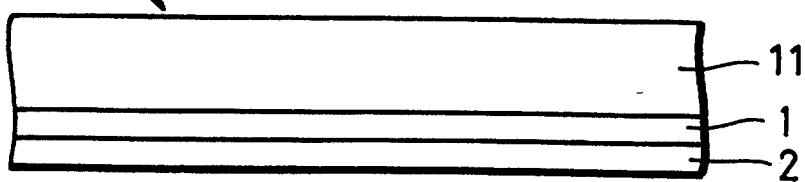
FIGS. 1 and 2 are fragmentary cross-sectional views of conventional magneto-optical recording mediums.
Figure 2:
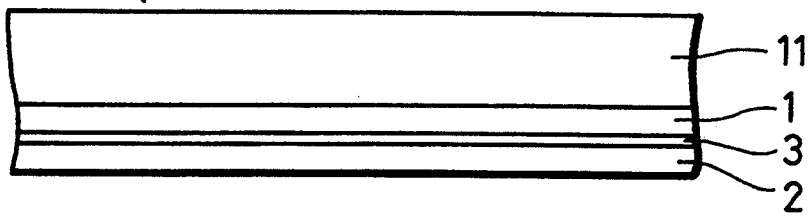
Figure 8:
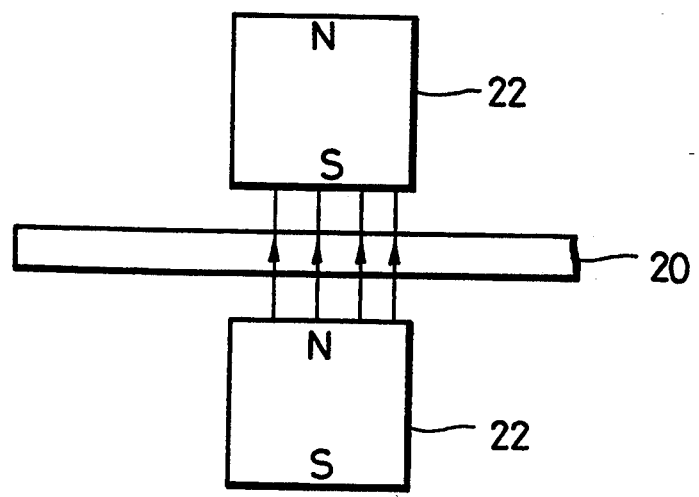
FIG. 8 is a schematic view showing an initializing magnetic flux distribution for initializing a recording layer in a conventional magneto-optical recording apparatus.
Figure 9:
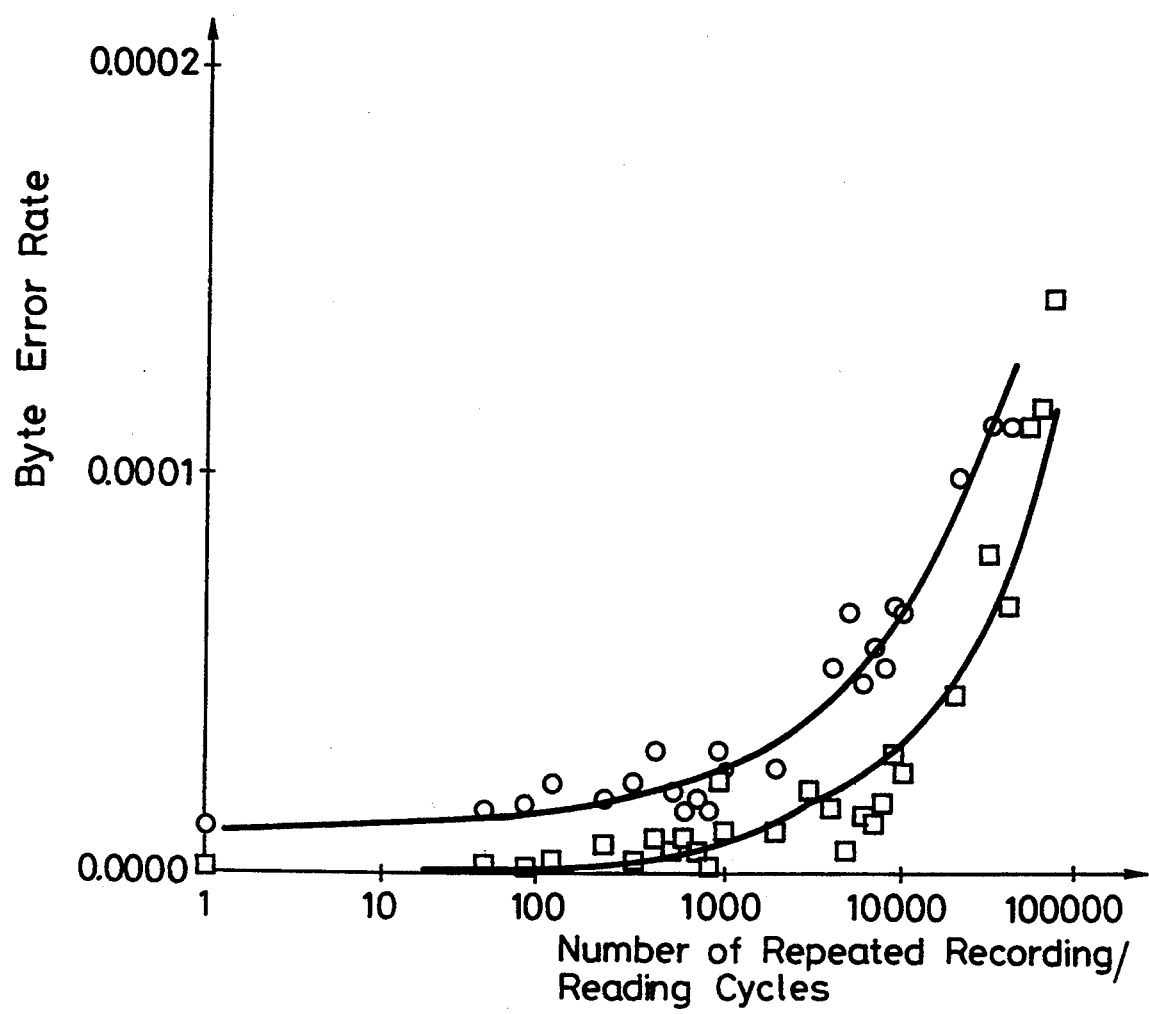
FIG. 9 is a graph showing measured error rates.

Error rates were measured with respect to the information recorded by the magneto-optical recording apparatus according to the present invention as shown in FIG. 5 and also to the information recorded by a conventional magneto-optical recording apparatus as shown in FIG. 8. In FIG. 8, a pair of magnets 22 is disposed as initializing magnetic field generators one on each side of the magneto-optical recording medium 20 for applying almost only a perpendicular magnetic field $H_V$ to the magneto-optical recording medium 20. The measured error rates are shown in FIG. 9. The graph of FIG. 9 has a horizontal axis indicative of the number of repeated recording/reading cycles and a vertical axis of the byte error rate. A curve plotted along the squares shows the error rate with the magneto-optical recording apparatus according to the present invention, and a curve plotted along the circles shows the error rate with the conventional magneto-optical recording apparatus. In the measurement process, the high recording laser beam power $P_H$ was 18.0 mW, the low recording laser beam power $P_L$ was 5.5 mW, and the external magnetic field $H_{ex}$ was 300 Oe. The initializing magnetic field was 4.0 kOe in the conventional magneto-optical recording apparatus shown in FIG. 8, and 2.5 kOe in the magneto-optical recording apparatus shown in FIG. 3. Study of FIG. 7 indicates that the increase in the error rate with the magneto-optical recording apparatus according to the present invention is so low that it will cause substantially no problem.

Figure 10:
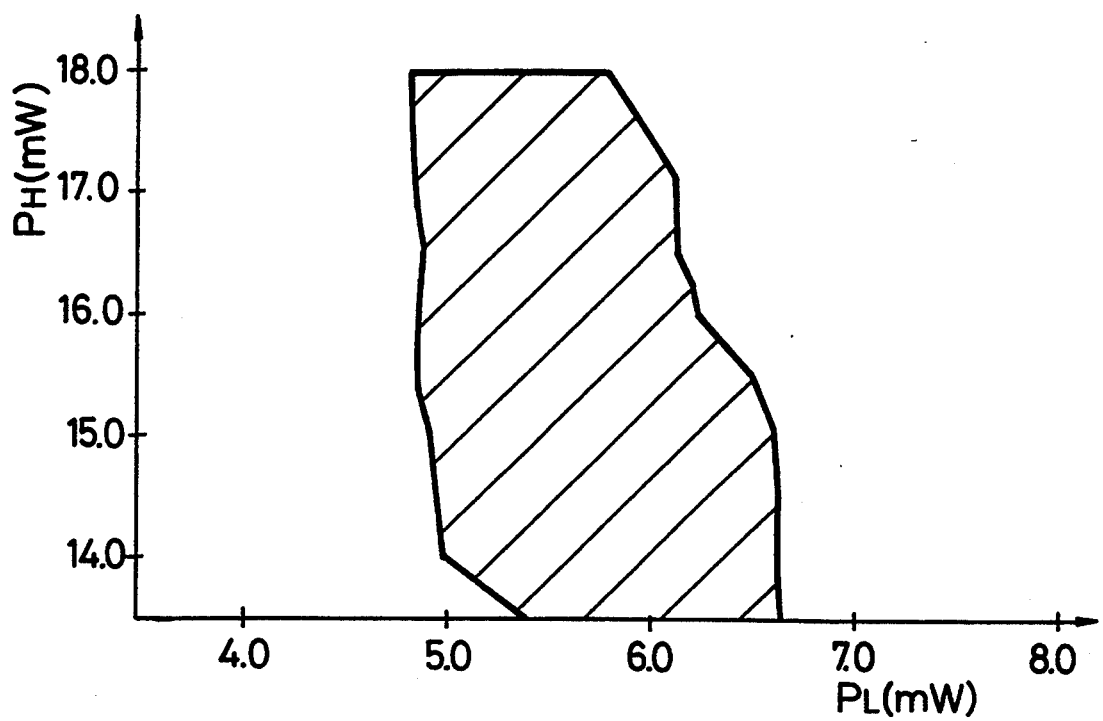
FIG. 10 is a graph showing a measured over-writable region in the magneto-optical recording apparatus according to the present invention.
Figure 11:
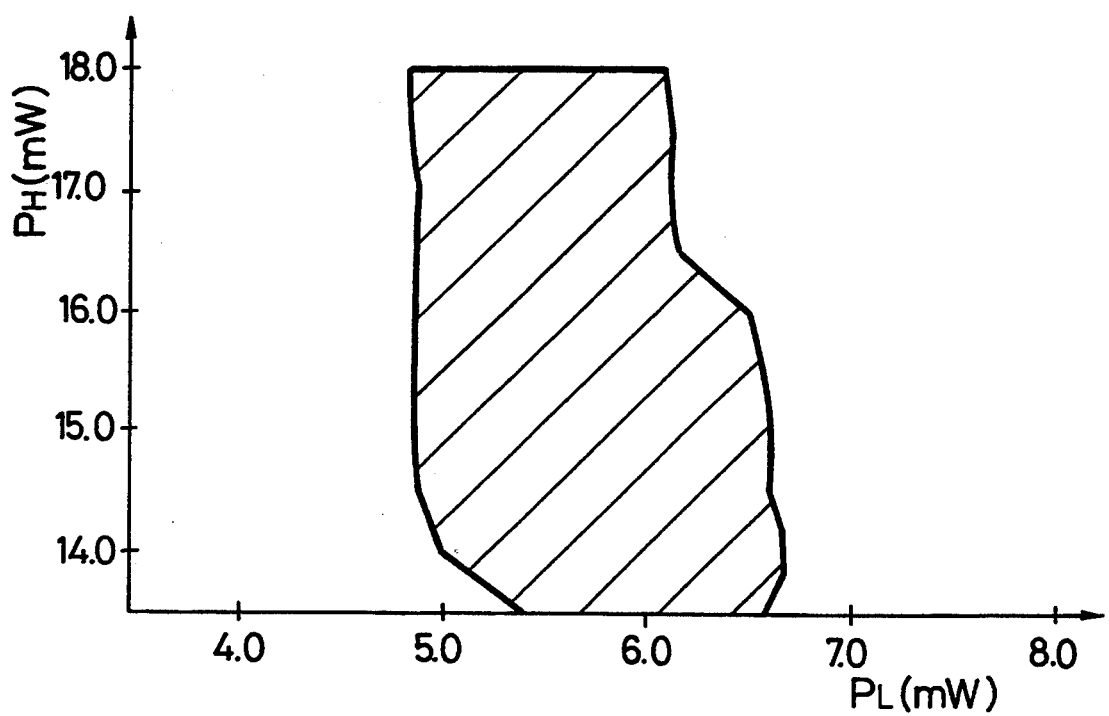
FIG. 11 is a graph showing a measured over-writable region in the conventional magneto-optical recording apparatus.

Overwritable regions in relation to the first and second temperatures $T_1$, $T_2$, i.e., the laser beam powers $P_H$, $P_L$, in the magneto-optical recording apparatus according to the present invention and the conventional magneto-optical recording apparatus are shown hatched in FIGS. 10 and 11, respectively. Comparison between FIGS. 10 and 11 shows that the margins of the overwritable region in relation to the laser beam powers $P_H$, $P_L$ in the magneto-optical recording apparatus according to the present invention are essentially equal to those in the conventional magneto-optical recording apparatus.

In the illustrated embodiment, the magneto-optical recording medium 20 is of a three-layer structure composed of memory, intermediate, and recording layers 1, 3, 2. However, the magneto-optical recording medium 20 may be of any of various multilayer structures including at least memory and recording layers 1, 2 with or without any intermediate layer, through suitable selection of characteristics of one or both of the memory and recording layers 1, 2.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A magneto-optical recording apparatus for recording information on a magneto-optical recording medium composed of a substrate, a memory layer and a recording layer which are disposed on the substrate, each of the memory and recording layers being comprising a magnetic thin film of amorphous-rare-earth transition-metal alloy, the memory and recording layers being magnetically coupled directly, or through an intermediate layer therebetween, to each other under an exchange force, said magneto-optical recording apparatus comprising:

recording magnetic field generating means for applying a recording magnetic field to the magneto-optical recording medium; and initializing magnetic field generating means for applying an initializing magnetic force to the magneto-optical recording medium, said initializing magnetic field generating means having a magnetic pole adapted to be disposed in confronting relationship to a surface of the magneto-optical recording medium, said initializing magnetic force comprising a magnetic field $H_V$ directed perpendicularly to the surface of the magneto-optical recording medium, and a magnetic field $H_H$ directed along the surface of the magneto-optical recording medium, said magnetic fields $H_V$, $H_H$ being defined as follows:

$$H_V \leq H_{C2} + H_{W2},$$

and $$H_H > \{(H_{C2} + H_{W2}) - H_V\} \times 1.7$$

where $H_{C2}$ is the coercive force of the recording layer and $H_{W2}$ is the exchange force.

2. A magneto-optical apparatus according to claim 1, wherein said exchange force $H_{W2}$ is given by:

$$H_{W2} = \sigma W / 2 M_{S2} h_2$$

where $\sigma w$ is the magnetic wall energy between the memory and recording layers when they are directly coupled to each other, or the magnetic wall energy between the intermediate and recording layers when the intermediate layer is interposed between the memory and recording layers, and $M_{S2}$ and $h_2$ are the saturation magnetizing force and thickness, respectively, of the recording layer.

* * * * *